US008996060B2

(12) United States Patent
Srikanteswara et al.

(10) Patent No.: US 8,996,060 B2
(45) Date of Patent: Mar. 31, 2015

(54) IMT AND NON-IMT WIRELESS COMMUNICATION DEVICE

(75) Inventors: Srikathyayani Srikanteswara, Portland, OR (US); Carlos Cordeiro, Portland, OR (US); Bahareh Sadeghi, Portland, OR (US); Reza Arefi, Great Falls, VA (US); Geoff O. Weaver, Portland, OR (US); David M. Horne, Chandler, AZ (US); Takashi Shono, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 13/533,335

(22) Filed: Jun. 26, 2012

(65) Prior Publication Data

US 2013/0273952 A1    Oct. 17, 2013

Related U.S. Application Data

(60) Provisional application No. 61/603,261, filed on Apr. 11, 2012.

(51) Int. Cl.
*H04M 1/00* (2006.01)
*H04W 72/00* (2009.01)
(Continued)

(52) U.S. Cl.
CPC ............... *H04W 4/24* (2013.01); *H04W 16/14* (2013.01); *H04W 24/08* (2013.01); *H04W 28/16* (2013.01); *H04W 72/04* (2013.01); *H04W 72/0486* (2013.01); *H04W 72/0493* (2013.01)
USPC ..................... 455/552.1; 455/553.1; 455/515; 455/550.1

(58) Field of Classification Search
CPC ........................ H04W 52/0267; H04W 48/18
USPC ................ 455/67.11, 550.1, 552.1, 509, 515, 455/553.1, 434, 452.1, 517, 454, 458; 370/311, 318
See application file for complete search history.

(56) References Cited

U.S. PATENT DOCUMENTS

2006/0143111 A1    6/2006  Mylet
2007/0223615 A1*   9/2007  Dosanjh et al. ............... 375/267
(Continued)

FOREIGN PATENT DOCUMENTS

WO    2013/155139 A1    10/2013

OTHER PUBLICATIONS

International Search Report and Written Opinion received for PCT Patent Application No. PCT/US2013/035901, mailed on May 30, 2013, 11 pages.

(Continued)

*Primary Examiner* — John J Lee
(74) *Attorney, Agent, or Firm* — Ellis B. Ramirez; Prass

(57) ABSTRACT

A communication apparatus associated with a system that uses two or more wireless standard in IMT and non-IMT bands. The invention is a wireless device with the ability to operate, transmit and/or receive, in one or more IMT bands and one or more non-IMT bands that are licensed to services and/or applications other than IMT. This is accomplished through inclusion in the wireless device of one or more radios operating in licensed IMT bands, an "IMT radio", and one or more radios operating in licensed non-IMT bands, a "non-IMT radio". A non-IMT radio could be a stand-alone, separate radio inside the wireless device or an extension or modification of the IMT radio in a way that it covers non-IMT bands.

18 Claims, 4 Drawing Sheets

Figure 1:
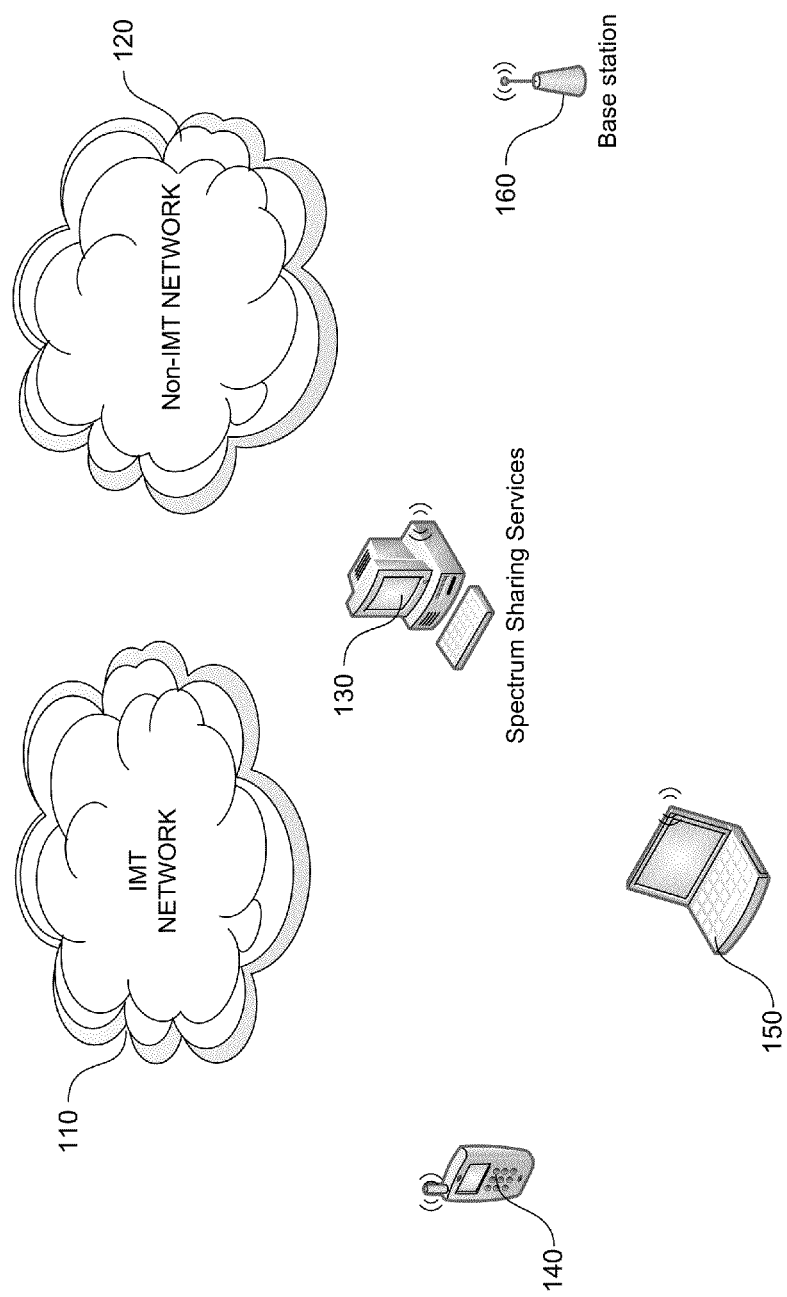

(51) Int. Cl.
*H04W 4/24* (2009.01)
*H04W 16/14* (2009.01)
*H04W 24/08* (2009.01)
*H04W 72/04* (2009.01)
*H04W 28/16* (2009.01)

(56) References Cited

U.S. PATENT DOCUMENTS

| | | |
|---|---|---|
| 2008/0150830 A1 | 6/2008 | Pan et al. |
| 2008/0219377 A1* | 9/2008 | Nisbet .................... 375/296 |
| 2008/0222019 A1 | 9/2008 | Stanforth et al. |
| 2009/0002077 A1* | 1/2009 | Rohani et al. ............ 330/305 |
| 2010/0093353 A1 | 4/2010 | Bu et al. |
| 2010/0151867 A1 | 6/2010 | Tran et al. |
| 2013/0196677 A1 | 8/2013 | Smith et al. |
| 2013/0201316 A1* | 8/2013 | Binder et al. ................ 348/77 |
| 2013/0273881 A1 | 10/2013 | Sadeghi et al. |
| 2013/0273933 A1 | 10/2013 | Sadeghi et al. |
| 2013/0273953 A1 | 10/2013 | Srikanteswara et al. |
| 2013/0273958 A1 | 10/2013 | Srikanteswara et al. |
| 2013/0275346 A1 | 10/2013 | Srikanteswara et al. |

OTHER PUBLICATIONS

International Preliminary Report on Patentability and Written Opinion for corresponding International Application No. PCT/US2013/035901, mailed on Oct. 23, 2014 (8 pages).

* cited by examiner

IMT AND NON-IMT WIRELESS COMMUNICATION DEVICE

CROSS-REFERENCES TO RELATED APPLICATIONS

This application claims priority to U.S. Provisional Application No. 61/603,261 entitled "INTELLIGENT SPECTRUM ALLOCATION BASED ON USER BEHAVIOR PATTERNS FOR EFFICIENT SPECTRUM USAGE," filed Apr. 11, 2012, the entire disclosure of which is incorporated herein by reference in its entirety.

BACKGROUND

1. Field of the Disclosed Embodiments

The present invention relates generally to wireless communications and more particularly to a communication apparatus that operates as a multi-standard compatible terminal that transmits and receives signals having different frequencies.

2. Introduction

Operation of current cellular devices in licensed spectrum worldwide is limited to certain bands such as those identified by the International Telecommunications Union (ITU) as International Mobile Telecommunications (IMT) inclusive of IMT-2000 and IMT-Advanced and their evolutions. As a result, devices constrained to operation in these bands cannot benefit from the potential offered by spectrum sharing techniques such as Dynamic spectrum Access (DSA), Cloud Spectrum Services (CSS), Authorized Shared Access (ASA), Licensed Shared Access (LSA) through which licensed, non-IMT spectrum could become available to cellular users and operators on a dynamic basis. Further, current devices do not generally include radios operating in licensed, non-IMT bands, regardless of whether those bands are operated as dynamically shared bands.

International Mobile Telecommunication (IMT) systems are mobile broadband systems including both IMT-2000 (commonly referred to as 3G systems) and IMT-Advanced (commonly referred to as 4G) and their evolutions. IMT systems provide access to a wide range of telecommunication services including advanced mobile services, which are increasingly packet-based. IMT systems support low to high mobility applications and a wide range of data rates in accordance with user and service demands in multiple user environments and have capabilities for high-quality multimedia applications within a wide range of services and platforms. Detailed specifications of IMT-2000 and IMT-Advanced systems and technologies are contained in International Telecommunication Union (ITU) Recommendation ITU-R M.1457 and Recommendation ITU-R M.2012, respectively.

Modern wireless mobile devices, including IMT devices described above, are typically comprised of multiple radios to enable operation in various frequency bands and/or various wireless networks running different technologies. For instance, a smart phone of today typically incorporates radios operating in licensed bands covering 2G (GSM), 2.5G (e.g. GPRS), and 3G (e.g. WCDMA, HSPA, and the like) technologies as well as radios operating in license-exempt bands covering technologies such as WiFi and Bluetooth.

Spectrum below 6 GHz, which is currently the most suitable spectrum for mobile applications, is allocated to a variety of services including the Mobile Service in ITU Radiocommunications Regulations (RR) that defines allocation of each and every frequency band to various Services (e.g., Mobile, Fixed, Broadcasting, and the like) on a regional and/or global basis. Allocations in the United States overlap significantly with those of the RR. However, only a small fraction, less than twenty percent (<20%), of this spectrum is identified for IMT applications in RR. IMT bands are bands allocated to the Mobile Service and specifically identified for operation of IMT systems and devices via relevant footnotes in RR. The rest is being used by other commercial or government applications, part of which is being lightly utilized due to the nature of the applications and services running in these bands. On the other hand, mobile networks are increasingly under bandwidth exhaustion pressures due to the rapid increase of user demand. This has led to formation of certain spectrum sharing concepts whereby cellular networks could temporarily "rent" or "lease" other licensed, non-IMT spectrum to cover capacity needs of their users. As noted above current mobile cellular devices (wireless devices), however, are not designed to take advantage of the opportunity in sharing these licensed, but under-utilized, non-IMT spectrum bands.

Some Example Embodiments

Therefore, there is a need for an approach for managing dynamic sharing of available spectrum services. In these embodiments there is proposed apparatus and non-transitory machine-accessible medium to temporarily "rent" their spectrum to mobile operators on the condition it can be relinquished to the primary license holder when needed. The proposed apparatus and non-transitory machine-accessible medium defines a wireless device capable of operating (transmit and/or receive) in one or more IMT bands AND one or more non-IMT bands that are licensed to services and/or applications other than IMT ("non-IM bands").

According to one embodiment, multi-standard wireless communication device, comprising a first radio unit capable of communicating in a first wireless standard, wherein the first radio unit can operate in one or more bands of the first wireless standard; a second radio unit capable of communicating in a second wireless standard, wherein the second radio unit can operate in one or more bands of the second wireless standard; and a control unit capable of implementing a control strategy to control operation of the communication device to use the first radio unit or the second radio unit in response to a triggering event.

According to another embodiment, a method of communicating using a multi-standard, multi-band wireless communication device comprising operating a first radio unit capable of communicating in a first wireless standard in response to a triggering event, wherein the first radio unit can operate in one or more bands of the first wireless standard; and operating a second radio unit capable of communicating in a second wireless standard in non-IMT bands in response to the triggering event, wherein the second radio unit can operate in one or more non-IMT bands of the first or second wireless standard; wherein a control unit capable of implementing a control strategy to operate the communication device to use the first radio unit and/or the second radio unit in response to the triggering event.

According to another embodiment, a non-transitory machine-accessible medium that provides instructions to communicate using a multi-standard, multi-band wireless communication device, which when accessed, cause a machine to perform operations comprising operating a first radio unit capable of communicating in a first wireless standard in response to a triggering event, wherein the first radio unit can operate in one or more bands, including IMT bands, of the first wireless standard; and operating a second radio unit capable of communicating in a second wireless standard in response to the triggering event, wherein the second radio unit can operate in one or more non-IMT bands of the second wireless standard; wherein the machine is a control unit capable of implementing a control strategy to operate the communication device to use the first radio unit and/or the second radio unit in response to the triggering event.

Exemplary embodiments are described herein. It is envisioned, however, that any system that incorporates features of any apparatus, method and/or system described herein are encompassed by the scope and spirit of the exemplary embodiments.

DETAILED DESCRIPTION OF THE DISCLOSED EMBODIMENTS

Figure 2:
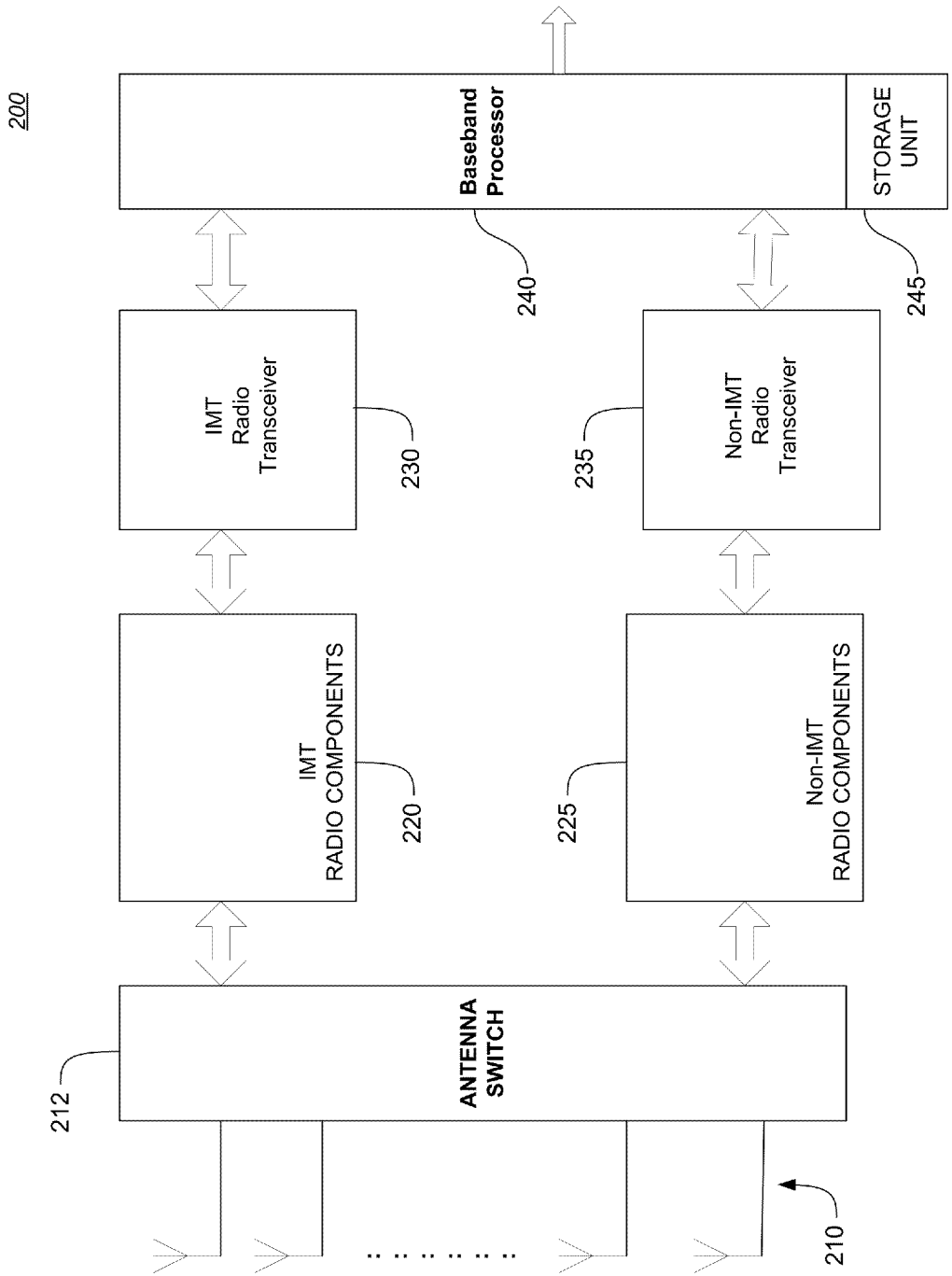
Figure 3:
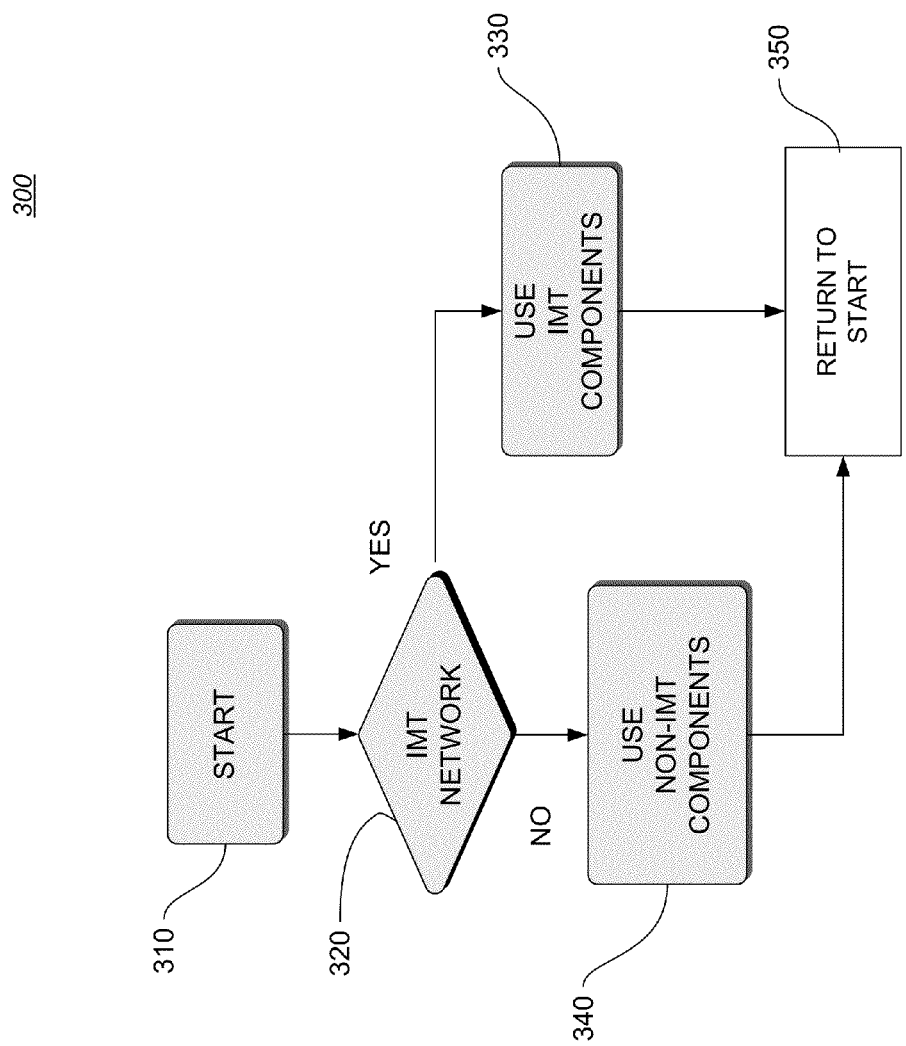
Figure 4:
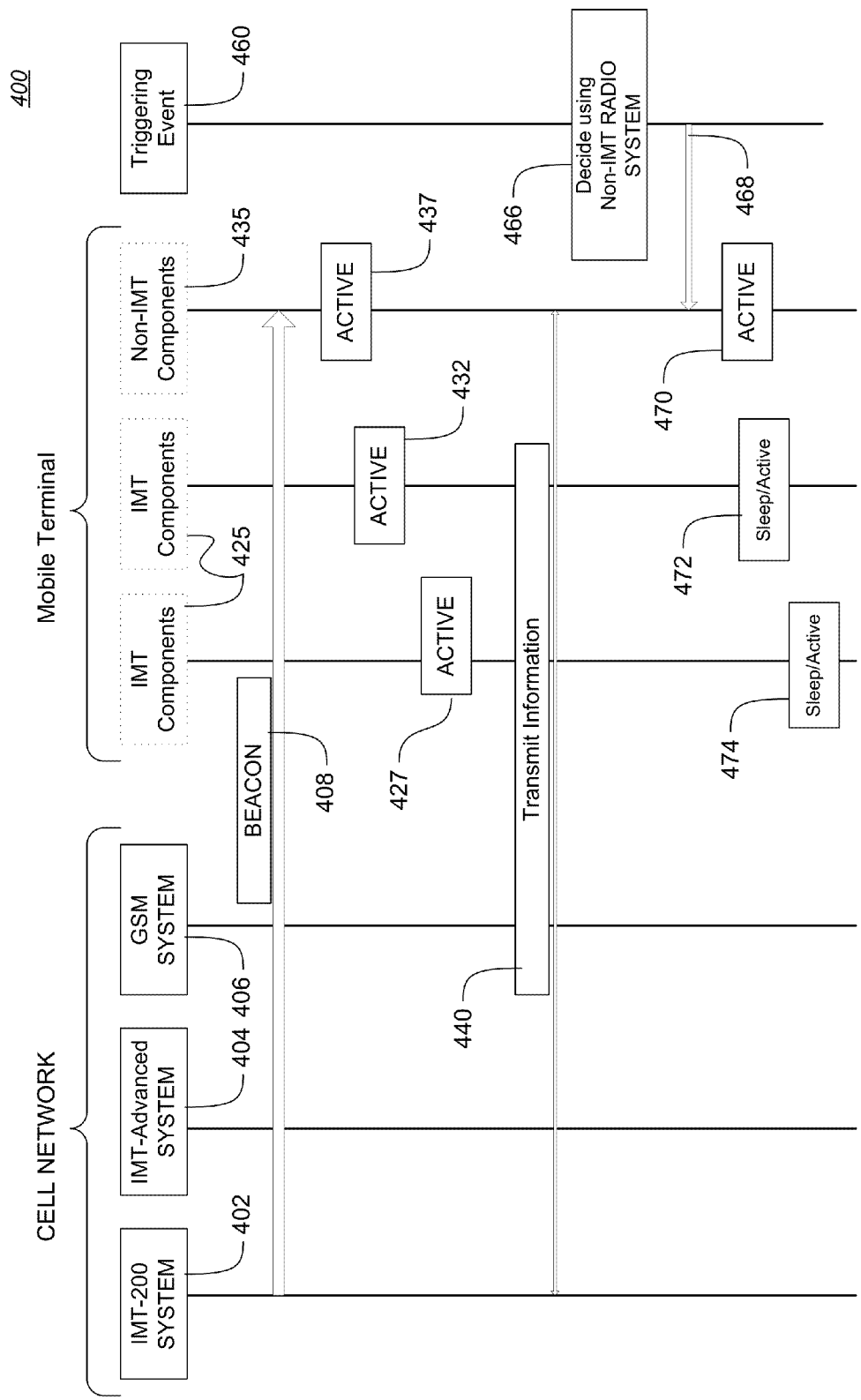

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic diagram illustrating an exemplary situation where a multi-standard, multi-band mobile terminal is able to join multi-standard, multi-band networks in accordance to an embodiment;

FIG. 2 a high-level block diagram of the device illustrating RF elements necessary to operate the device in a second wireless standard band in addition to a first wireless standard in accordance to an embodiment;

FIG. 3 is a flowchart of a method of communicating using a multi-standard wireless communication device in accordance to an embodiment; and FIG. 4 is a sequence diagram of communicating using a multi-standard wireless device in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "spectrum asset" is a right to use, usually in a specific geographic area, a range of electromagnetic radiation, from the highest frequency to the lowest. The spectrum encompasses everything from X-rays and gamma rays to visible light and radio waves. Additionally, the spectrum asset can be reduced to a set of time slots selected from a group consisting of hours, days, time blocks, minutes, and seconds or to a frequency range that is also reducible to a set of time slots.

The term "Cloud Spectrum Services (CSS)" is used herein to refer to a dynamic spectrum rental scheme that uses a cloud-based database and optimization engine to allocate available spectrum to client devices.

The term "Multi-mode device (MMD)" is used herein to primarily refer to a wireless device to transmit and/or receive data to/from a fixed network infrastructure, and includes for example a mobile device, tablet, computing device, TV sets, hand held (HH) device. An MMD could also be capable of directly using spectrum resources assigned by a Cloud Spectrum Broker (CSB). An MMD can engage in wired or wireless communication with other devices.

As used herein the terms "lease" and "rent" are synonymous.

The term "Primary Spectrum Holder (PSH)," in the context of a cloud spectrum services (CSS) transaction, is a spectrum owner with rights conveyed by a regulatory authority to a portion of the radio spectrum that will be dynamically managed by a CSB and reallocated for temporary use to MMDs and/or Alternate Spectrum Holders (ASHs). Examples include TV broadcasters, cellular operators, and government agencies (military, public safety, and the like).

The term "Alternate Spectrum Holder (ASH)" as used herein is any entity which provides MMDs with access to a fixed network infrastructure. Examples include cellular operators and government agencies. In Cloud Spectrum Services (CSS) an ASH is a user that can request spectrum from a cloud spectrum broker.

The term "Cloud Spectrum Database (CSD)" is used herein to refer to a device to store data that are used by a CSB to dynamically manage the spectrum asset such as a radio spectrum resource, i.e., spectrum availability at a given time in a given location. The CSD can be deployed by a third party or as part of an ASH or PSH network.

The term "Content Provider (CP)" is used herein to refer to content providers such as ESPN, Netflix, Hulu, Disney and Amazon. A CP may establish service agreements directly with MMDs and uses the services of a CSB to ensure reliable delivery of content to MMDs across any communication infrastructure such as wireless media. In Cloud Spectrum Services (CSS) a CP is a user that can request spectrum from a cloud spectrum broker.

The term "Cloud Spectrum Broker (CSB)" refers to the entity responsible for managing CSS transactions and for optimizing the use of the spectrum asset like a radio spectrum resource across a geographical area on the basis of parameters such as PSH offerings, ASH requirements and requests, MMD capabilities and requests, CP offerings and requirements, and application requirements.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term "wireless device" as used herein includes, for example, a device capable of wireless communication, a communication device capable of wireless communication, a mobile terminal, a communication station capable of wireless communication, a portable or non-portable device capable of wireless communication, mobile terminal, or the like. In some embodiments, a wireless device may be or may include a peripheral device that is integrated with a computer, or a peripheral device that is attached to a computer. In some embodiments, the term "wireless device" may optionally include a wireless service.

As used herein, the term "network" is used in its broadest sense to mean any system capable of passing communications from one entity to another. Thus, for example, a network can be, but is not limited to, a wide area network, a WiFi network, a cellular network, and/or any combination thereof.

FIG. 1 is a schematic diagram illustrating an arrangement 100 where a multi-standard, multi-band mobile terminal is able to join multi-standard, multi-band networks in accordance to an embodiment. In the illustration a mobile terminal is able to move its operation, using the services provided by Spectrum Sharing Services 130, from a first network 110 using a first wireless standard operating in IMT spectrum to a second spectrum band that is non-IMT 120 using a the same first standard or a second wireless standard because it has a radio interface that can support the first and second wireless standards and both IMT and non-IMT bands radio transceivers. The first wireless standard can be from a group consisting of IMT-2000, IMT-Advanced, and their evolutions, also referred to as IMT, while the second wireless standard could be selected from a group consisting of IMT and its evolutions, IEEE 802.11, IEEE 802.16, IEEE 802.20, general packet radio system (GPRS), global standards for mobile communication (GSM), GSM 850, GSM 900, GSM 1800, GSM 1900 and other similar wireless communication standards, operating in non-IMT spectrum bands. The mobile terminal is able to transmit and/or receive in one or more of the first or second wireless standards and bands. For example, the mobile terminal can transmit and/or receive using the IMT standard in the ITU-R RR. A wireless standard is a radio protocol that can refer to a set of pre-determined rules used by two or more mobile devices to exchange signals. The mobile terminal can be a multiband mobile terminal mainly used in the IMT network 110 and can be configured to scan bands of the IMT network 110. Also, the mobile terminal can be a multiband mobile terminal mainly capable of operation in the Non-IMT bands 120 and can be configured to scan other bands used by the Non-IMT network 120.

The mobile terminal can be Mobile Station (MS) such as a smart phone 140, also referred to as User Equipment (UE), a Base Station (BS) 160 that could function as a repeater Station (RS), or a wireless device 150 such as a laptop. This device could be operated while in motion (e.g. a smart phone), in a portable manner (e.g. a laptop), or in a stationary manner (e.g. a base station). The mobile terminal is provided with a plurality of alphanumeric keys for receiving alphanumeric data and function keys for configuring and executing various functions.

The mobile terminal operation as an IMT radio using IMT network 110 and as a non-IMT radio using non-IMT network spectrum 120 could be simultaneous or sequential but seamless and transparent to users. Device operation in either band (IMT and non-IMT) could use conventional radios or Cognitive Radio Systems (CRS) or other reconfigurable radio systems. A cognitive radio system (CRS) is a radio system employing technology that allows the system to obtain knowledge of its operational and geographical environment, established policies and its internal state; to dynamically and autonomously adjust its operational parameters and protocols according to its obtained knowledge in order to achieve predefined objectives; and to learn from the results obtained. Operation of the device in a wireless standard could be coordinated by the network it is attached to or done in an independent manner managed by the user or third party like spectrum sharing services 130. Spectrum sharing services 130 is any of the vehicles for obtaining dynamic access to spectrum such as Dynamic spectrum Access (DSA), Cloud Spectrum Services (CSS), Authorized Shared Access (ASA), Licensed Shared Access (LSA) through which licensed, IMT or non-IMT spectrum could become available to cellular users and operators on a dynamic basis.

The mobile terminal can be reconfigured based on the occurrence of a triggering event that causes the terminal to select the wireless standard and/or spectrum band best suited for communication. This triggering event can be discovered, communicated to the terminal, or selected by the user or external source. The triggering event can be cognitive radio systems (CRS) or other reconfigurable radio systems, coordinated by the network it is attached to or done in an independent manner managed by the user or through a spectrum sharing assignment 130.

FIG. 2 a high-level block diagram of the device illustrating RF elements necessary to operate the device in a second wireless standard and/or spectrum band (e.g. non-IMT) in addition to a first wireless standard (e.g. IMT) in accordance to an embodiment. The block diagram shows a mobile terminal 200 that includes one or more radios to allow communication with other devices. Mobile terminal 200 may operate in wireless networks such as IMT systems such as IMT-2000 and IMT-Advanced and their evolution, but it could also include operation through non-IMT standards such as, for example, Wireless Fidelity (Wi-Fi) that provides the underlying technology of Wireless Local Area Network (WLAN) based on the IEEE 802.11 specifications, WiMAX and Mobile WiMAX based on IEEE 802.16-2005 and its evolution, and Global System for Mobile Communications (GSM) networks, although the present invention is not limited to operation in only these networks. The multi-radio subsystem collocated in the same platform of communications device 200 provides the capability of communicating in an RF/location space with the other devices in the network using the IMT standards through radios operating in non-IMT bands. Accordingly, the advanced mobile platform of mobile terminal 200 includes an antenna(s) that permits adaptive tuning to different frequencies to meet the requirements of the multi-radio, multi-band platforms. Communication Device operation could be transmit-only, receive-only, or both transmit and receive (half- or full-duplex), and could use any form of duplexing or multiplexing known to one skilled in the art, such as Time Division Duplex (TDD) or Frequency Division Duplex (FDD). Operation of the device, processing a triggering event, could be deactivated by the user of the wireless network at any time. A non-IMT radio could be a stand-alone, separate radio inside the device or an extension or modification of the IMT radio in a way that it covers non-IMT bands.

The antenna switching 212, selection or assigning by the processor such as baseband processor 240 is based on inputs, which provide information on which protocols are operative or active, what programs or applications are running, which antennas 210 are connected to which transceivers/transmitters/receivers, how strong the signal being received from each receiver is, and feedback from base stations on how strong the signal is that they are receiving from the device (at least for those base stations supporting protocols that have this feature), and a triggering event, which determine how the device is being used, how a user is holding the device, which orientation the device is in, or which features of the device are open or closed. The antenna switching 212, selection or assignment by the processor thus depends on the triggering event to select the antenna 210 or a combination of antennas 210.

The individual radio protocols are depicted as individual processing blocks that receive signals selected by the antenna switch 212, the radio components are shown as block components like IMT radio components 220 with IMT transceiver 230 and Non-IMT radio components 225 with transceiver 235 which comprise circuitry such as filters, duplexers, oscillators, and the like operating, or capable of operation, in either a first or second group of wireless standards in either IMT or non-IMT bands.

The baseband processor 240 can be used as control unit to control general operations of the mobile terminal. Particularly in an exemplary embodiment, the processor controls a series of processes related for the camp-on procedure of the mobile terminal. The processor controls to extract the band indicator from the system information message transmitted by a base station and store the band indicator within storage unit 245.

The storage unit 245 stores application programs related to the operations of the mobile terminal and application data. The storage unit 245 also stores the control information extracted from the system information message transmitted by base stations and the different triggering event. Particularly in an exemplary embodiment of the present invention, the storage unit 245 is provided with a band indicator storage region for storing the band indicator contained in the system information message. The processor can create in storage unit 245 a lookup table identifying the wireless standard with its associated band indicator.

FIG. 3 is a flowchart of a method 300 of communicating using a multi-standard, multi-band wireless communication device in accordance to an embodiment. Referring to FIG. 3, the baseband processor 240 of the mobile terminal detects a triggering event to start method 300. The triggering event can be from a CRS process, a user, or from a cloud spectrum service that indicates to the mobile terminal the network and/or bands to use for communication. In action 320, the process determines from the triggering event if an IMT network is to be used for communication. If the decision is "YES" then control is passed to action 330 where IMT Components such as components 220 and 230 are used for communication. In action 350, control is then returned to start at action 310 where the mobile terminal listens for a triggering event. If the decision in action 320 is that a Non-IMT network/spectrum band is to be used control is passed to action 340 where the Non-IMT components namely components 225 and 235 are used for communication. After using the Non-IMT components control is returned to the start of method 300.

FIG. 4 is a sequence diagram 400 of communicating using a multi-standard, multi-band wireless device in accordance to an embodiment. The sequence diagram 400 illustrates a scenario where there are multiple radio systems forming a cellular network for moving traffic. The illustrated cellular network system uses an IMT-2000 system 402, an IMT-Advanced system 404, and a GSM or other non-IMT radios such as 802.11, 802.15, 802.16, etc. system 406 for routing radio traffic. The systems transmit signals 408 corresponding to the control information to the mobile terminal. The control information is received at antenna 210 which causes antenna switch 212 to route the signal (control information) to IMT components 425 and Non-IMT components 435 respectively. The mobile terminal is set in an active state upon reception of the control information (427, 432, and 437). The mobile terminal and system may transmit information 440 between each other to engage in wireless communication. If a triggering event 460 is encountered at the mobile terminal, like receiving a signal from an external source that a cloud spectrum service has allocated available spectrum in non-IMT bands 406, the device will process the event and change accordingly. If a control unit at the terminal decides to use the non-IMT bands 466 the Non-IMT components 435 are activated 470 or kept active while the IMT components are either deactivated or put to sleep (472, 474) or could also be kept active for better performance based on decision made in the cell network.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Various processes to support the establishment of an automated spectrum trading and the optimization of spectrum allocation have been described. Using the disclosed approach, efficient and productive use of spectrum may be made, while minimizing the procedural and transactional burdens on spectrum holders or spectrum users. Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A multi-standard wireless communication device comprising:
   a first radio unit configuring of or configurable of communicating in a first wireless standard, wherein the first radio unit can operate in one or more bands of the first wireless standard;
   a second radio unit configuring of or configurable of communicating in the first or a second wireless standard, wherein the second radio unit can operate in one or more bands of the second wireless standard; and
   a control unit configuring of or configurable of implementing a control strategy to control operation of the communication device to use the first radio unit or the second radio unit in response to a triggering event;
   wherein the triggering event is a signal from a broker in a cloud spectrum service that manages dynamic spectrum availability from spectrum holders advertising their spectrum for rent.

2. The multi-standard, multi-band wireless communication device in accordance to claim 1, wherein the triggering event is a signal from a user of the communication device, a network, or from a spectrum sharing managing device.

3. The multi-standard, multi-band wireless communication device in accordance to claim 1, wherein first wireless standard is selected from a group consisting of IMT standards (IMT-2000, IMT-Advanced) and their evolution.

4. The multi-standard, multi-band wireless communication device in accordance to claim 3, wherein second wireless standard is selected from a group of standards consisting of IMT and their evolution, IEEE 802.11, IEEE 802.15, IEEE 802.16, IEEE 802.20, UMTS, GSM 850, GSM 900, GSM 1800, GSM 1900, GPRS, operating in non-IMT bands.

5. The multi-standard, multi-band wireless communication device in accordance to claim 4, wherein the communication device is at least one of mobile station (MS), user equipment (UE), a base station (BS), a repeater station (RS), mobile computing device, or computer.

6. The multi-standard, multi-band wireless communication device in accordance to claim 5, wherein the control unit comprises a baseband processor configured to receive data signal via an electric interface from the first radio unit and/or the second radio unit and to output a modulated signal.

7. A method of communicating using a multi-standard, multi-band wireless communication device comprising:
   operating a first radio unit capable of communicating in a first wireless standard in response to a triggering event, wherein the first radio unit can operate in one or more bands of the first wireless standard; and
   operating a second radio unit configuring of or configurable of communicating in a second wireless standard in non-IMT bands in response to the triggering event, wherein the second radio unit can operate in one or more non-IMT bands of the first or second wireless standard;
   wherein a control unit capable of implementing a control strategy to operate the communication device to use the first radio unit and/or the second radio unit in response to the triggering event;
   wherein the triggering event is a signal from a broker in a cloud spectrum service that manages dynamic spectrum availability from spectrum holders advertising their spectrum for rent.

8. The method in accordance to claim 7, wherein the triggering event is a signal from a spectrum sharing managing device, a network, or from a user of the communication device.

9. The method in accordance to claim 7, wherein first wireless standard is selected from a group consisting of IMT standards (IMT-2000, IMT-Advanced) and their evolution.

10. The method in accordance to claim 9, wherein second wireless standard is selected from a group of standards such as IMT standards and their evolution, IEEE 802.11, IEEE 802.15, IEEE 802.16, IEEE 802.20, GSM 850, GSM 900, GSM 1800, GSM 1900, GPRS operated in non-IMT bands.

11. The method in accordance to claim 10, wherein the communication device is at least one of mobile station (MS), user equipment (UE), a base station (BS), a repeater station (RS), mobile computing device, or computer.

12. The method in accordance to claim 11, wherein the control unit comprises a baseband processor configured to receive data signal via an electric interface from the first radio unit and/or the second radio unit and to output a modulated signal.

13. A non-transitory machine-accessible medium that provides instructions to communicate using a multi-standard, multi-band wireless communication device, which when accessed, cause a machine to perform operations comprising:
   operating a first radio unit configuring of or configurable of communicating in a first wireless standard in response to a triggering event, wherein the first radio unit can operate in one or more bands, including IMT bands, of the first wireless standard; and
   operating a second radio unit configuring of or configurable of communicating in a second wireless standard in response to the triggering event, wherein the second radio unit can operate in one or more non-IMT bands of the second wireless standard;
   wherein the machine is a control unit configuring of or configurable of implementing a control strategy to operate the communication device to use the first radio unit and/or the second radio unit in response to the triggering event.

14. The non-transitory machine-accessible medium in accordance to claim 13, wherein the triggering event is a signal from a spectrum sharing managing device, a network, or from a user of the communication device and wherein the control unit comprises a baseband processor configured to receive data signal via an electric interface from the first radio unit and/or the second radio unit and to output a modulated signal.

15. The non-transitory machine-accessible medium in accordance to claim 14, wherein first wireless standard is selected from a group consisting of IMT standards (IMT-2000, IMT-Advanced) and their evolution.

16. The non-transitory machine-accessible medium in accordance to claim 15, wherein the communication device is at least one of mobile station (MS), user equipment (UE), a base station (BS), a repeater station (RS), mobile computing device, or computer.

17. The non-transitory machine-accessible medium in accordance to claim 13, wherein the triggering event is a signal from a broker in a cloud spectrum service that manages dynamic spectrum availability from spectrum holders advertising their spectrum for rent and wherein the control unit comprises a baseband processor configured to receive data signal via an electric interface from the first radio unit and/or the second radio unit and to output a modulated signal.

18. The non-transitory machine-accessible medium in accordance to claim 17, wherein second wireless standard is selected from a group of standards such as IMT and their evolution, IEEE 802.11, IEEE 802.15, IEEE 802.16, IEEE 802.20, GSM 850, GSM 900, GSM 1800, GSM 1900, GPRS operated in non-IMT bands.

* * * * *